UNITED STATES PATENT OFFICE.

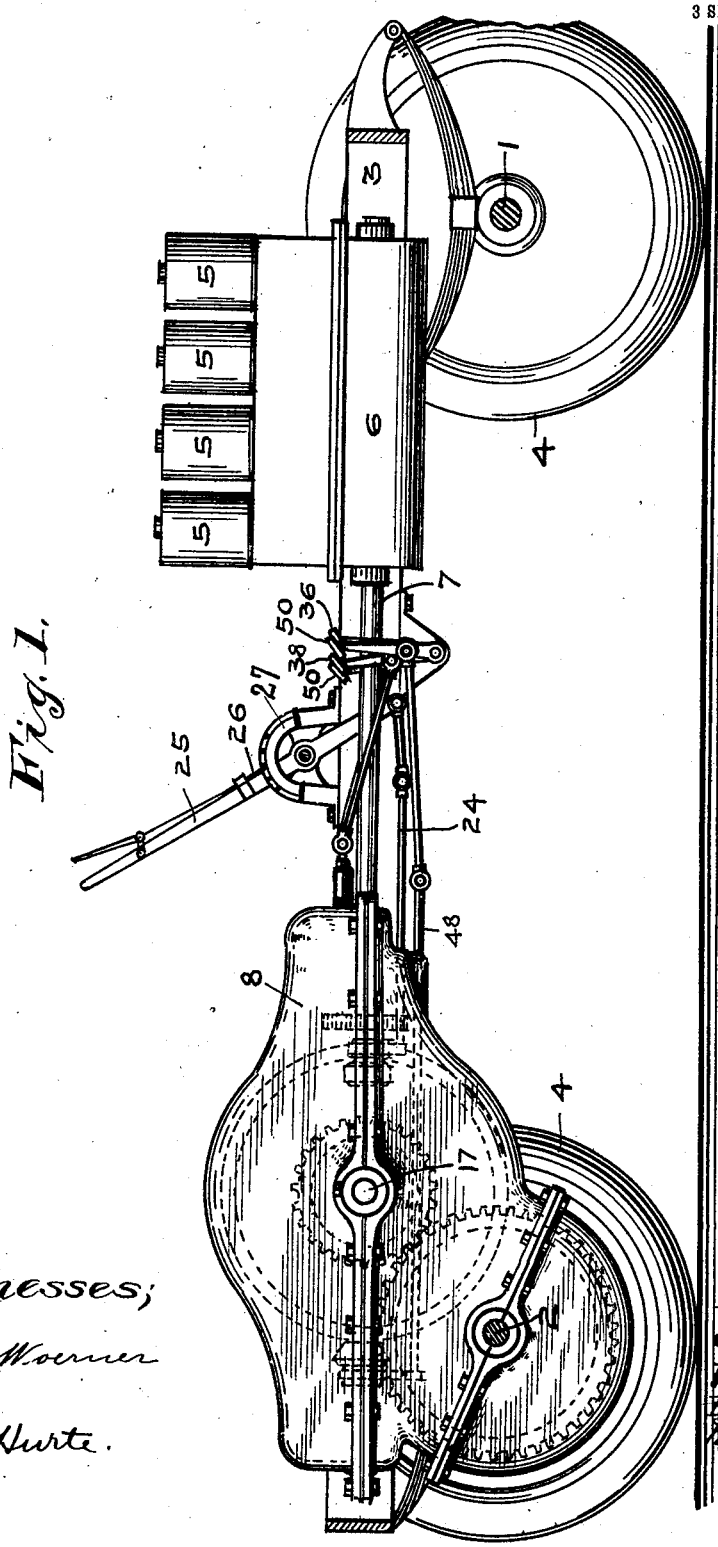

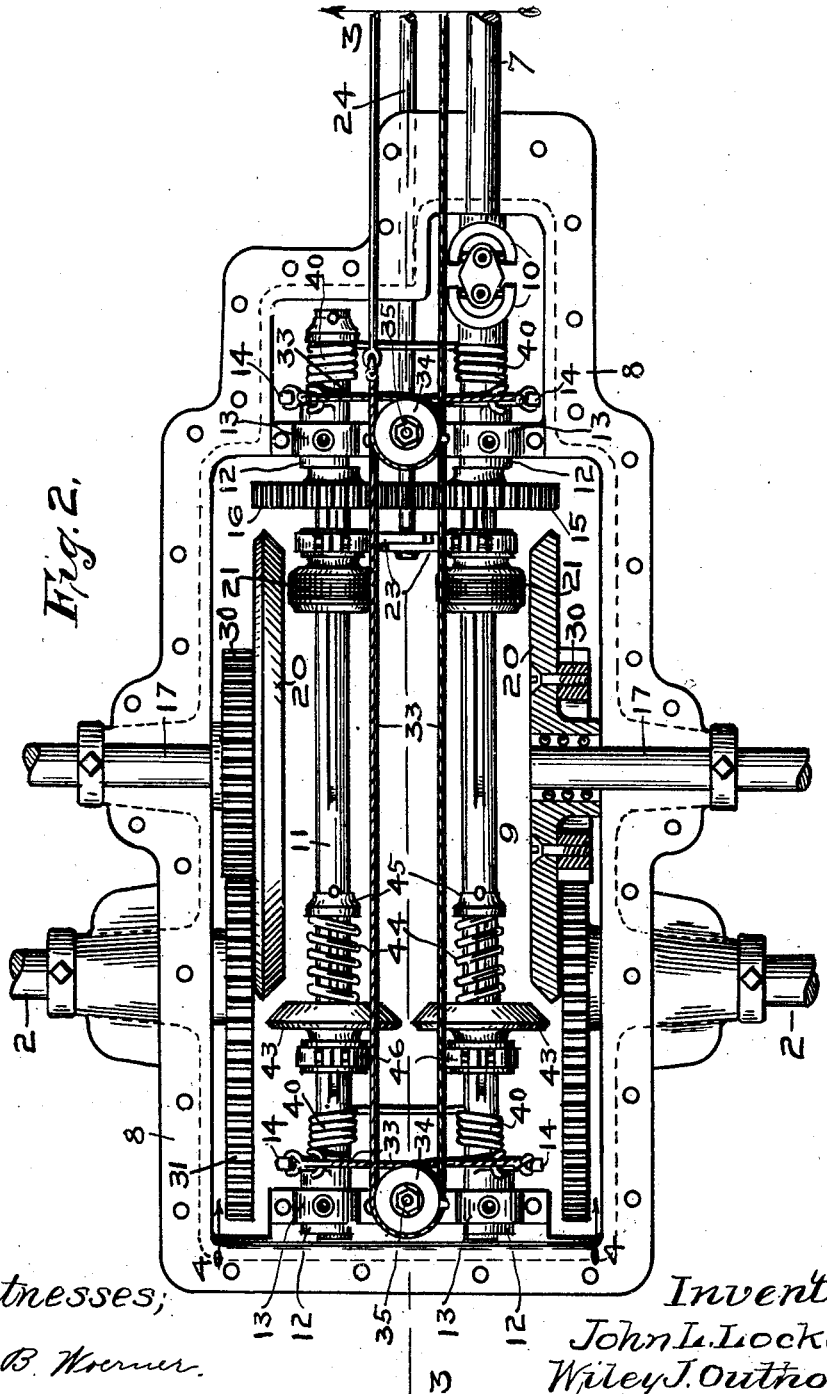

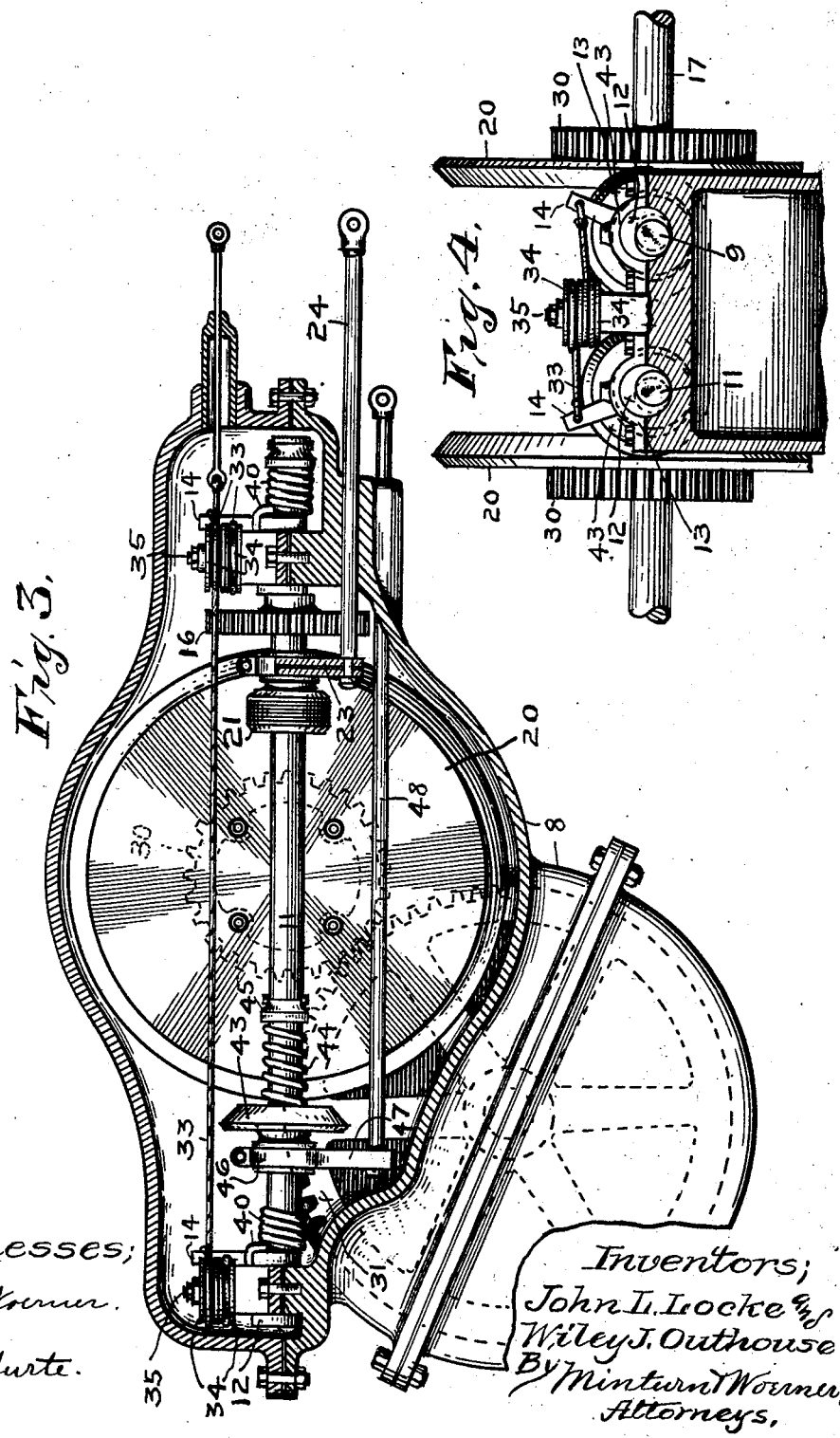

JOHN L. LOCKE AND WILEY J. OUTHOUSE, OF INDIANAPOLIS, INDIANA, ASSIGNORS OF ONE-THIRD TO WILLIAM O. BEVER, OF MUNCIE, INDIANA.

POWER-TRANSMISSION MECHANISM.

No. 925,490.   Specification of Letters Patent.   Patented June 22, 1909.

Application filed September 18, 1908. Serial No. 453,677.

*To all whom it may concern:*

Be it known that we, JOHN L. LOCKE and WILEY J. OUTHOUSE, citizens of the United States, residing at Indianapolis, in the county of Marion and State of Indiana, have invented certain new and useful Improvements in Power-Transmission Mechanism, of which the following is a specification.

This invention relates to mechanism for transmitting power from an engine to the traction wheels of a motor-vehicle.

One object of the invention is to provide means for permitting the two driving wheels to move at different speeds with relation to each other, or in other words to dispense with the usual differential gearing by embodying it in the power transmission mechanism.

Another object of the invention is to provide means for varying the speed of a driven part with relation to the driving part and to provide means whereby the driven part may be reversed while the driving part is rotating in the one direction.

Other objects and advantages of this invention, as well as the novel details of construction, will be hereinafter specifically described, it being understood that changes in the form, proportion, and minor details of construction, may be made without departing from the spirit or sacrificing any of the advantages of the invention.

We accomplish the objects by the mechanism illustrated in the accompanying drawings, in which—

Figure 1 is a detail in longitudinal vertical section of the frame and driving mechanism of an automobile equipped with our improvement, the view being on a vertical plane just inside of the near road wheels. Fig. 2 is a detail in top plan view of the power transmission mechanism as mounted within its gear case with the top part or cover of the gear case removed. Fig. 3 is a longitudinal vertical section on the line 3—3 of Fig. 2, and Fig. 4 is a detail in transverse section on the line 4—4 of Fig. 2.

Like characters of reference indicate like parts throughout the several views of the drawings.

1 is the front axle, 2 the rear axle, 3 the horizontal frame of the body, and 4 the ground or traction wheels of an automobile of any suitable and usual construction.

5 are the cylinders of a quadruple engine, and 6 the crank-case.

7 is the crank or main driving shaft through which power is transmitted to the engine from the transmission mechanism of our invention.

8 is a gear case within which the major portion of our improved variable speed gearing is mounted in order to protect same from dust and other injury. This gear case is a sectional one, that is, made of three parts, each part being provided with flanges through which bolts are passed to fasten the parts together. The driving shaft 7 is mounted in a fixed manner in the front end of the case 8 and terminates with a short extension inside of said case.

9 is a continuation of shaft 7 and is connected to the latter by the compound universal joint 10 which joint permits the extension 9 to be adjusted laterally.

11 is an auxiliary shaft parallel with the shaft extension 9 and mounted wholly within the case. Both shafts 9 and 11 are eccentrically mounted in enlarged cylindrical portions 12, and the cylindrical portions 12 are mounted in ordinary journal boxes 13 which are supported by the case 8 and are located adjacent to opposite ends of said case. The enlarged cylindrical portions 12 are provided with the lateral lever extensions 14 by means of which the parts 12 are rocked thereby imparting a lateral movement to shafts 9 and 11 due to their eccentric mounting in the enlarged cylindrical parts 12. As shown in Fig. 4, when the levers 14 are at their maximum separation the shafts 9 and 11 are at their closest relation to each other and by drawing the upper ends of levers 14 toward each other their shafts 9 and 11 are correspondingly separated. Mounted on the shaft 9 is a spur gear 15 which meshes with the spur gear 16 mounted on the shaft 11. The teeth of these two gear wheels are sufficiently long to prevent disengagement of the two gears when the shafts 9 and 11 are at their maximum separation and they also work satisfactorily when the shafts 9 and 11 are at their minimum separation.

Mounted in the casing 8 at diametrically opposite sides thereof are a pair of shafts 17 in axial alinement with each other. These shafts terminate within the gear-case and mounted on their inner ends are the friction driven disks 20. The disks 20 are two in number with the shafts 9 and 11 passing diametrically between them.

21 are friction driving wheels, one of which is mounted upon each of the two shafts 9 and 11. The wheels 21 are loosely splined to their respective shafts whereby they are adjustable longitudinally of said shafts. Collars on hub extensions of wheels 21 are connected by a bar 23. A rod 24 is attached to the bar 23 and extends to the lower end of a hand lever 25 (see Fig. 1) by means of which the driving wheels 21 are shifted on their respective shafts toward or from the centers of their adjacent disks 20. Any given adjustment or position of the wheels 21 will be retained by dog 26 entering one of the notches of the sector 27. In the position of shafts 9 and 11 as shown in Fig. 2, the driving wheels 21 will be out of contact with the driven disks 20, but by drawing the ends of each pair of levers 14 toward each other the shafts 9 and 11 will be moved laterally away from each other so as to make driving contact between the wheels 21 and disks 20 whereby said disks 20 will be rotated. The speed at which disks 20 will be rotated will vary with the distance of wheels 21 from the centers of their respective disks 20. The nearer wheels 21 are to the centers of their disks 20, the more rapid will be the rotation of said disks. Turning with the disks 20, here shown as bolted to the backs of said disks, are gear wheels 30 which mesh with spur gears 31 mounted upon the respective inner ends of the two independently driven shafts 2. Gear wheels 31 and their axle-stubs 2 are so connected that the wheel and axle rotate together.

Attached to levers 14 are cables 33. These cables extend to and around a pulley 34, there being one pulley for each of the four levers, those for the adjacent levers of each pair being mounted one above the other for convenience, on pins 35 supported by the case 8. The free ends of the cables attached to levers 14 controlling shaft 9 (there are two of such levers, one at each end of the case 8) are connected with a foot lever 36 (see Fig. 1) whereby the movement of said foot lever will simultaneously move said front and rear levers 14 thereby equally operating both front and rear eccentric mountings of shaft 9 and causing both ends of the shaft to move equally in a lateral direction. Both of the levers 14 of shaft 11 are likewise connected to cables 33 which pass around similar pulleys 34 and are both attached in like manner to a foot lever 38. When both of the foot levers 36 and 38 are pressed forward all four of the levers 14 will be drawn inwardly thereby moving their shafts 11 and 9 laterally toward their respective adjacent friction disks 20 so as to revolubly operate said disks 20 and through gears 30 and 31 rotating both members of the rear axle 2, causing the automobile to travel in a forward direction at a speed determined by the position of wheels 21 on said shafts 9 and 11 relative to the centers of the disks 20.

Should it be desired to turn the machine, by releasing the foot lever on the side which will be the inner side of the desired turn or curve, the rear traction wheel on that side of the machine will be released from the motive power while the wheel on the opposite side will continue to be driven, and this will provide a differential gear without any additional mechanism. The levers 14 will be automatically moved to a normal maximum separation by the springs 40.

It will be noted that the inner edges of the disks 20 are beveled which is for the purpose of driving engagement with beveled friction disks 43 which are slidingly mounted upon the respective shafts 9 and 11 and are splined thereto so as to rotate with their respective shafts. The beveled wheels 43 are held normally out of contact with disks 20 by springs 44 which are mounted around shafts 9 and 11 in the manner shown, between collars 45 fixed on said shafts, and the respective wheels 43. The hubs of the beveled wheels 43 are grooved to receive collars 46 having downward extensions 47 to which rods 48 are attached. These rods run forward through the case 8 and outside thereof to the respective foot levers 50, and by the forward movement of said foot levers or one of them, both or one, as the case may be, of the beveled wheels 43 will be brought into contact with the beveled disks 20 thereby imparting a reverse movement to said disks 20. By bringing both wheels 43 simultaneously into contact with disks 20 the machine will be made to travel backward in a straight direction, but by bringing only one of the wheels 43 into contact with its disk 20 the machine may be readily backed in a curve by turning the front axle at an angle to the rear axle. When the reverse wheels 43 are to be used the disks 20 are first released from the driving wheels 21.

Having thus fully described our invention what we claim as new and wish to secure by Letters Patent of the United States, is—

1. A pair of parallel rotatable bodies, a pair of parallel rotatable shafts between said bodies; both of said shafts being independently movable but always in parallelism transversely of their axes and friction wheels mounted on said shafts.

2. A pair of parallel rotatable bodies, a pair of parallel rotatable shafts between said bodies crossing the axes of said bodies substantially at right angles; both of said shafts being independently movable transversely of their axes, and friction wheels mounted on said shafts.

3. A pair of parallel rotatable bodies, a pair of parallel rotatable shafts diametrical of and between said bodies, both of said shafts being independently movable transversely of their axes, means for moving said shafts, and friction wheels mounted on said shafts and adapted to be brought into engagement with said rotatable bodies.

4. A pair of parallel rotatable bodies, a pair of parallel rotatable shafts diametrical of and between said bodies, both of said shafts being movable transversely of their axes, means for independently or collectively moving said shafts, and friction wheels mounted on said shaft adapted to be brought into engagement with said rotatable bodies.

5. A pair of parallel rotatable disks, two independently driven shafts, means for drivingly connecting each of said shafts with a corresponding one of said disks, a pair of parallel rotatable shafts diametrical of and between said disks, both of said shafts being movable transversely of their axes, means for independently moving said shafts, and friction wheels mounted on said shafts and adapted to be brought into engagement with said rotatable disks.

6. In a friction driving mechanism for automobiles, a gear case, a pair of parallel rotatable disks mounted in said case, a pair of parallel rotatable shafts mounted in said case diametrical of and between said disks in eccentric bearings, means for rocking one or both of said eccentric bearings to move their shafts transversely of their axes and friction wheels mounted on said shafts and adapted to be brought into engagement with said disks.

7. A pair of parallel rotatable bodies, a pair of parallel rotatable shafts between said bodies movable transversely of their axes, means for independently moving said shafts, friction wheels mounted on said shafts and adapted to be brought into engagement with said rotatable bodies, and means for adjusting the friction wheels longitudinally of their shaft.

8. A pair of parallel rotatable bodies, a pair of parallel rotatable shafts between said bodies crossing the axis of said bodies substantially at right angles; both of said shafts being independently movable transversely of their axes, friction wheels mounted on said shafts and adapted to be brought into engagement with said rotatable bodies by the lateral adjustment of their shafts, and means for moving the friction wheels longitudinally of their shafts.

9. A pair of parallel rotatable disks, a pair of parallel rotatable shafts between said disks independently movable transversely of their axes, friction wheels mounted on said shafts and adapted to be brought into driving engagement with the disks by the transverse movement of their shafts, and other friction wheels movable longitudinally upon said shafts and adapted to be brought into engagement with the rims of the disks.

10. A pair of parallel rotatable disks having inside beveled edges, a pair of parallel rotatable shafts between said disks crossing the axis of said disks substantially at right angles; both of said shafts being independently movable transversely of their axes, friction wheels mounted on said shafts and adapted to be brought into engagement with said disks by the transverse movement of the shafts, other friction wheels mounted on said shafts and movable longitudinally thereon, said last friction wheels having beveled peripheries adapted to engage the beveled peripheries of said disks, and means for moving the last friction wheels longitudinally of their shafts in and out of engagement with said disks.

11. A pair of parallel rotatable disks with inside beveled peripheries, a pair of parallel rotatable shafts diametrical of and between said disks, both of said shafts being independently movable transversely of their axes, means for moving shafts transversely of their axes, friction wheels mounted on said shafts and adapted to be brought into an engagement with said rotatable disks by the transverse movement of their shafts, beveled friction wheels mounted on said shafts and adapted to move longitudinally of the shafts into and out of engagement with the beveled disks, means for normally holding the beveled wheels out of engagement with the disks, and means for moving the beveled wheels into engagement with the disks.

In witness whereof we have hereunto set our hands and seals at Indianapolis, Indiana, this, 22nd day of August, A. D. one thousand nine hundred and eight.

JOHN L. LOCKE. [L. S.]
WILEY J. OUTHOUSE. [L. S.]

Witnesses:
F. W. Woerner,
L. B. Woerner.